United States Patent [19]

Bernhardt

[11] Patent Number: 5,082,053

[45] Date of Patent: Jan. 21, 1992

[54] ARRANGEMENT FOR CLEANING CONTAMINATED GROUND WATER

[75] Inventor: Bruno Bernhardt, Reutlingen, Fed. Rep. of Germany

[73] Assignee: IEG Industrie-Engineering GmbH, Betzingen, Fed. Rep. of Germany

[21] Appl. No.: 581,748

[22] Filed: Sep. 13, 1990

[30] Foreign Application Priority Data

Sep. 16, 1989 [DE] Fed. Rep. of Germany ....... 3931012
Oct. 6, 1989 [DE] Fed. Rep. of Germany ....... 3933426

[51] Int. Cl.⁵ .............................................. E21B 43/02
[52] U.S. Cl. ...................................... 166/115; 166/67; 166/106; 166/311; 166/369
[58] Field of Search ............... 166/265, 267, 369, 370, 166/69, 67, 74, 117, 313, 311, 312, 106, 115

[56] References Cited

U.S. PATENT DOCUMENTS

| | | | |
|---|---|---|---|
| 311,024 | 1/1885 | Miller | 166/74 |
| 2,299,734 | 10/1942 | Betts | 166/106 X |
| 2,986,215 | 5/1961 | Barr | 166/67 |
| 4,372,389 | 2/1983 | Hamrick et al. | 166/106 X |
| 4,531,593 | 7/1985 | Elliott et al. | 166/370 X |

FOREIGN PATENT DOCUMENTS 242248 1/1987 Fed. Rep. of Germany ...... 166/369
878907 11/1981 U.S.S.R. ............................... 166/106

*Primary Examiner*—Hoang C. Dang
*Attorney, Agent, or Firm*—Michael J. Striker

[57] ABSTRACT

An arrangement for cleaning contaminated ground water and the ground through which it passes with a shaft extending to the region of the ground water to be cleaned has a shaft wall including a plurality of water permeable and water impermeable wall portions with one of the water impermeable wall portions located between water permeable wall portions, a tightly inserted partition located above a ground water level in the one water impermeable wall portion and having an opening, a throughgoing passage extending in the opening and forming a part of a flow path of a ground water and ending above a ground water level in the well shaft, a circulating pump arranged in the well shaft for circulating the ground water along the flow path, and a filter arranged in the well shaft in the flow path of the ground water circulated by the circulating pump.

12 Claims, 2 Drawing Sheets

ARRANGEMENT FOR CLEANING CONTAMINATED GROUND WATER

BACKGROUND OF THE INVENTION

The present invention relates to an arrangement for cleaning contaminated ground water and the ground through which it passes.

More particularly it relates to such an arrangement which has a shaft extending to the region of ground water to be cleaned and provided with a shaft wall including a plurality of water permeable and water impermeable wall portions. Arrangements of the above mentioned general type are known in the art. It is believed that such arrangements can be further improved to make them simpler in construction and in use.

SUMMARY OF THE INVENTION

Accordingly, it is an object of the present invention to provide an arrangement for cleaning contaminated ground water which has a simple construction and is simple to use.

In keeping with these objects and with others which will become apparent hereinafter, one feature of the present invention resides, briefly stated, in an arrangement for cleaning contaminated ground water, in which a tightly insertable partition is arranged under the ground water level in a water impermeable portion of the shaft wall located between the water permeable portions and has an opening for a throughgoing passage which forms a part of a flow path circulating pump arranged in the wall shaft and ends above the ground water level in the well shaft, and a filter is located in the region of the well shaft in the flow path of the pump.

When the arrangement is designed in accordance with the present invention, the cleaning is performed inside the built shaft. Aspiration of the ground water outside of the shaft and its return through additional absorption is dispensed with. Here the available drilled shafts can be referred to as long as they have at least locally a water permeable shaft wall above the ground water level.

The arrangement of the absorption and withdrawal wells one above the other in a shaft prevents lifting of the ground water in the surrounding area of the well shaft as in the case of conventional withdrawal wells. Thereby the danger of structure sinking is avoided, which is observed in the vicinity of the withdrawal wells. Moreover, the constant ground water level in the surrounding area of the well shaft guarantees a uniform flow of the ground water in all ground layers. In contrast to this, in the case of the withdrawal wells higher speeds in the well shaft vicinity occur due to the sinking of the ground water level. Therefore the ground water from ground layers which have high flow speed of water drives water from the layers with slower flow speed. Slower flowing ground water is as a rule contaminated stronger than faster flowing ground water, so that the efficiency of filtering devices with separate shafts for absorption and withdrawal wells is low.

The filter can be formed at least partially as a ring filter before the water permeable portions of the shaft wall and located above and/or below the partition. Advantageously, the throughgoing passage which accommodates the circulating pump is expanded at a side of the partition to form a housing with a filter insert. The outer wall of the housing can extend at a distance from the shaft wall and be provided with a water inlet or water outlet at its end spaced from the partition.

The arrangement formed in accordance with the present invention can also have a pipe for coating a well opening. The pipe can be formed water permeable before the insertion for example by forming openings in it, and ring filters can be arranged at such regions. In many cases it suffices when a shaft wall of the above mentioned type is provided only in the opening regions up to the ground water level. The arrangement in accordance with the present invention can also operate only with filters arranged in the above mentioned housing.

The partition in accordance with the present invention can be formed as a cup-shaped insert with an outer surface provided with an inflatable clamping hose for mounting purposes. The cup-shaped insert can be lowered together with the throughgoing passage which accommodates the pump and connected with the insert and together with the filter housing, into the well shaft above the ground water layer. Then it can be clamped by inflating of preferably several outer clamping hoses in the valve shaft, and simultaneously a sealing of the gap between the cup-shaped insert and the shaft wall is obtained.

The filter inserts of the arrangement can be cleaned or regenerated in accordance with known processes for the repeated use of the arrangement. This is true especially for the filter inserts accommodated in the filter housing.

In accordance with an advantageous further embodiment of the arrangement, the throughgoing passage extends from the withdrawal valve to the absorption valve above the ground surface. There it is possible to clean and prepare the ground water in treatment devices located outside the well shaft. The treatment device can advantageously be arranged inside the throughgoing passage before the ground water is supplied through the throughgoing passage again into the shaft. The end of the throughgoing passage is located above the ground water level in the upper half of the well shaft which operates as an absorption valve. Advantageously, the circulating pump can be also arranged in the throughgoing passage and above the ground surface. Thereby the flow supply and the repair possibilities for the pump are simplified.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
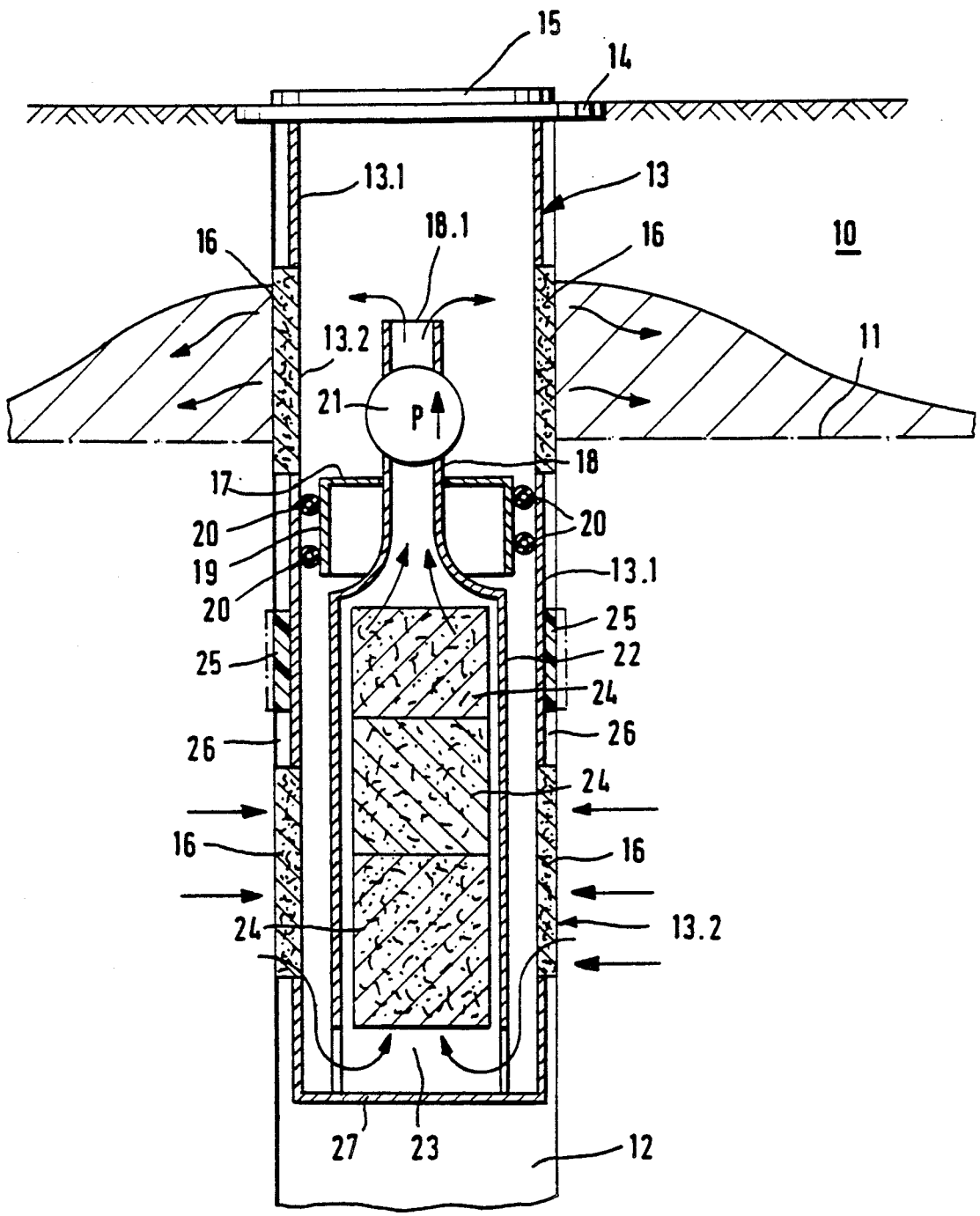
FIG. 1 is a view showing a schematic longitudinal section of an arrangement for cleaning contaminated ground water in accordance with the present invention.

In the arrangement shown in FIG. 1 a well shaft 12 is drilled in the contaminated ground 10 and extends to a level 11 with ground water. A tubular body 13 is inserted into the well shaft and includes water impermeable wall portions 13.1 and water permeable wall portions 13.2. The tubular body 13 abuts with a flange 14 against an opening edge of the well shaft 12 and is closeable by a cover 15. Before the water permeable wall portion 13.2, ring filters 16 are arranged. Their construction corresponds to the type of impurities to be removed. For example, activated carbon filter rings with a water permeable protective sleeve can be used as such filters.

A partition 17 is inserted in the tubular body 13 under the ground water level 11. It has an opening in which a tubular throughgoing passage 18 is inserted. The partition 17 forms a bottom of a cup-shaped insert body 19. Two inflatable clamping hoses 20 are arranged on the outer surface of the insert body 19 and, after insertion of the insert body, are inflated for clamping on a water impermeable wall portion 13.1 of the tubular body 13. The tubular throughgoing passage 18 has an upper opening 18.1 located above the ground water level 11 in the region of a water permeable wall portion 13.2 of the tubular body 13. An electrically operated circulating pump 21 is arranged inside the tubular throughgoing passage 18. The tubular throughgoing passage 18 is expanded in its lower region to form a cylindrical housing 22. The housing 22 has a lower inlet opening 23 filled with several filter inserts 24.

The water, impermeable wall region 13.1, in which the insert body 19 provided with the partition 17 is anchored, lies between two water permeable wall portions 13.2 and is provided on its outer side with a seal pack 25. The seal pack 25 provides for a sealing of an annular gap 26 between the wall of the well shaft 12 and the tubular body 13. The tubular body 13 in the shown embodiment is closed at its inner end by an end wall 27.

During the operation of the circulating pump 21, ground water penetrating into the tubular body 13 through the lower ring filter 16 is aspirated into the housing 22 with the filter inserts 24. Then it is transported through the filter insert 24 and the throughgoing passage 18 into the chamber of the tubular body 13 located above the ground water level 11 and separated by the partition 17, as shown by the arrow. From there the upwardly transported ground water can flow out through the upper ring filter 16 into the surrounding ground 10. Due to the outer seal pack 25, the upwardly transported ground water cannot flow through the ring gap 26 back into the well shaft 12. The ground water cleaned by the filter is again supplied back into the ground 10 and takes again the impurities before flowing back into the well shaft 12.

Figure 2:
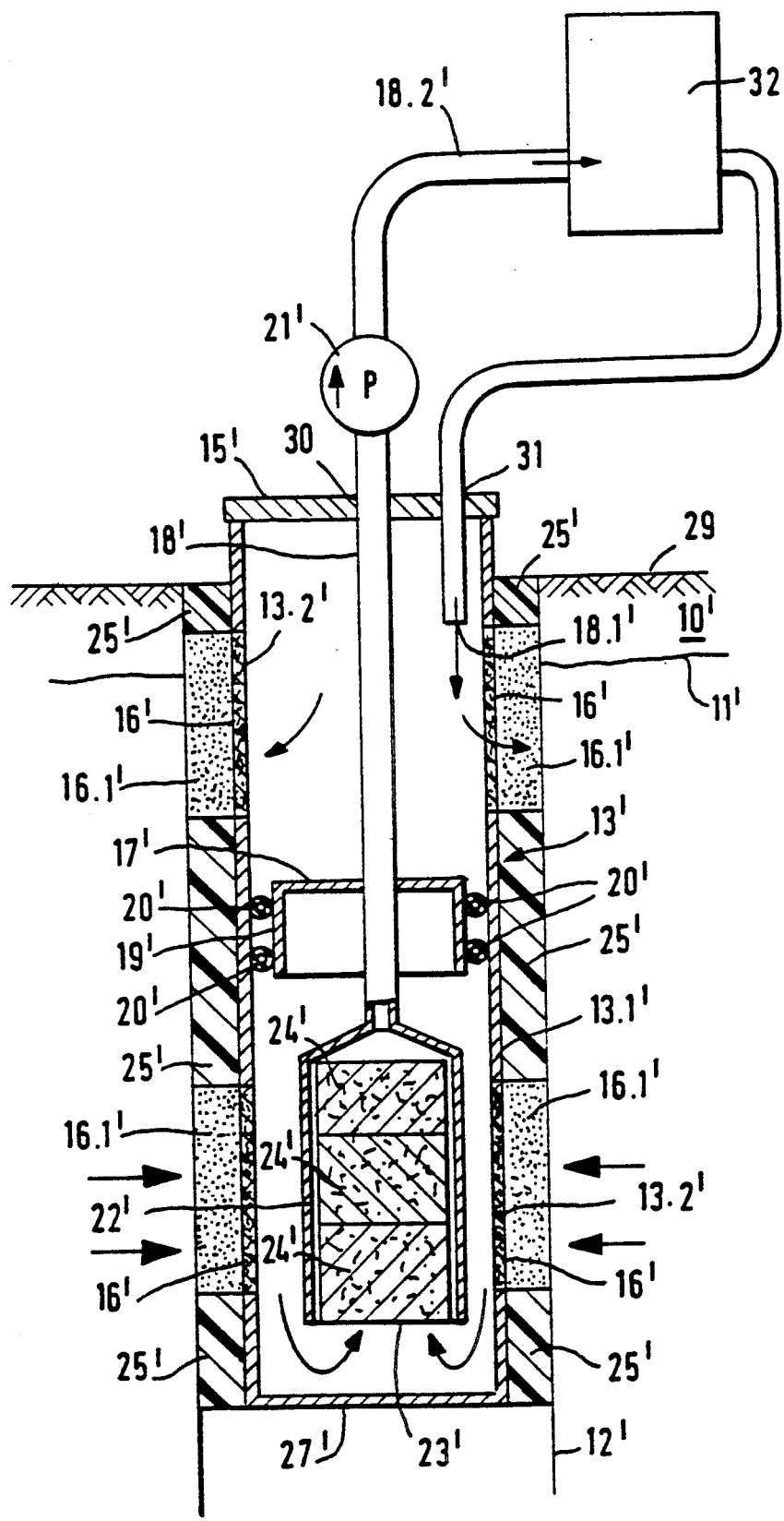
FIG. 2 is a view substantially corresponding to the view of FIG. 1 but showing another embodiment of the inventive arrangement.

In the arrangement shown in FIG. 2 the throughgoing passage 18' extends above the partition 17 through the whole upper half of the tubular body 13', flows through a first opening 30 in the cover 15' outwardly of the tubular body 13' to the ground surface 29 and then through a second opening 31 in the cover 15' again into the tubular body 13'. A circulating pump 21' and a treatment device 32 for further cleaning and preparation of the ground water are arranged in the portion 18.2' of the throughgoing passage 18' which lies above the ground surface 29. The treatment device 32 can be for example a cold reactor for freezing out of dirt particles or refining device for the ground water. Therefore the treatment device 32 can be simultaneously used as measuring and controlling station for the quality of the ground water obtained by the cleaning.

Under the action of the circulating pump 21' the ground water penetrating through the water permeable wall portions 13.2' of the tubular body 13' is aspirated into the cylindrical housing 22' filled with the filter inserts 24' from the lower side 23'. Then it passes via the throughgoing passage 18' through the partition 17', the cover 15' to the earth surface 29, where the ground water passes the circulating pump 21' and reaches the treatment device 32. After leaving the treatment device 32 the purified and/or prepared ground water flows through the portion 18.2' of the throughgoing passage which extends above the ground surface, and the opening 31 in the cover 15' again into the interior of the tubular body 13'. There it leaves a throughgoing passage 18' through its end opening 18.1' located above the ground water level 11' and discharges through the upper water permeable wall portion 13.2' of the tubular body 13' into the surrounding ground. Therefore the ground water is again purified by the ring filter 16' and the filter gravel 16.1' arranged on the water permeable wall portion 13.2'.

The arrangement can operate without the ring filters 16, 16' with the inner filter inserts 24, 24'. Also, the end wall 27, 27' of the tubular body 13, 13' can be formed as a filter wall.

It will be understood that each of the elements described above, or two or more together, may also find a useful application in other types of constructions differing from the types described above.

While the invention has been illustrated and described as embodied in an arrangement for cleaning contaminated ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for cleaning contaminated ground water and the ground through which it passes with a well shaft extending to the region of the ground water to be cleaned, comprising a shaft wall including a plurality of water permeable and water impermeable wall portions with one of said water impermeable wall portions located between two water permeable wall portions; a tightly inserted partition located below a ground water level in said one water impermeable wall portion and having an opening, said water impermeable wall portion in which said partition is located being located between an upper on of said water permeable wall portions, which is at least partially located above the ground water level on the one hand and a lower one of said water permeable wall portions which is located below the ground water lever, means forming a throughgoing passage extending in said opening and forming a part of a flow path which includes a fluid flow passage from one side of the partition through one of the permeable wall portions, the ground surrounding the well shaft and the other of the permeable wall portions to the other side of the partition; a circulating pump arranged for circulating the ground water along the flow path; and a filter for purifying the ground water arranged in the well shaft in the flow path of the ground water circulated by the circulating pump.

2. An arrangement as defined in claim 1; and further comprising an additional filter formed partially as a ring filter and arranged around each of said water permeable portions.

3. An arrangement as defined in claim 1, wherein said shaft wall in the region of said water impermeable wall portion which has said partition is provided with an outer seal.

4. An arrangement as defined in claim 1, wherein said partition is formed as a cup-shaped insert body provided with at least one inflatable clamping hose on its outer surface for mounting of said partition.

5. An arrangement as defined in claim 1, wherein said means forming said throughgoing passage is located partially outside of the well shaft and extends above the ground surface.

6. An arrangement as defined in claim 5, wherein said means forming said throughgoing passage has a portion located above the ground surface and provided in said portion with a treatment device for treating a purified ground water.

7. An arrangement as defined in claim 1, wherein said means forming said throughgoing passage has a portion extending above the ground surface, said circulating pump being located inside the throughgoing passage in said portion.

8. An arrangement as defined in claim 1, wherein said filter is located below said partition, said means forming a throughgoing passage being formed so that it has one end located under said partition and another end located above said partition.

9. An arrangement as defined in claim 1, wherein said means forming a throughgoing passage is formed so that the flow path has an upper end ending directly in the well shaft.

10. An arrangement for cleaning contaminated ground water and the ground through which is passes with a well shaft extending to the region of the ground water to be cleaned, comprising a shaft wall including a plurality of water permeable and water impermeable wall portions with one of said water impermeable wall portions located between two water permeable wall portions; a tightly inserted partition located below a ground water level in said one water impermeable wall portion and having an opening; means forming a throughgoing passage extending in said opening and forming a part of a flow path of the ground water and ending above the ground water level; a circulating pump arranged for circulating the ground water along the flow path; and a filter arranged in the well shaft in the flow path of the ground water circulated by the circulating pump, said means forming said throughgoing passage at one side of said partition being expanded so as to form a housing with an outer wall spaced from said shaft wall, said housing accommodating a filter insert.

11. An arrangement as defined in claim 10, wherein said housing has an end which is spaced form said partition and provided with a water connection.

12. An arrangement as defined in claim 11, wherein said water connection is formed as a water inlet.

* * * * *